W. SINCLAIR.
ENSILAGE CUTTING MACHINE.
APPLICATION FILED JULY 26, 1917.
1,247,460.
Patented Nov. 20, 1917.
2 SHEETS—SHEET 1.
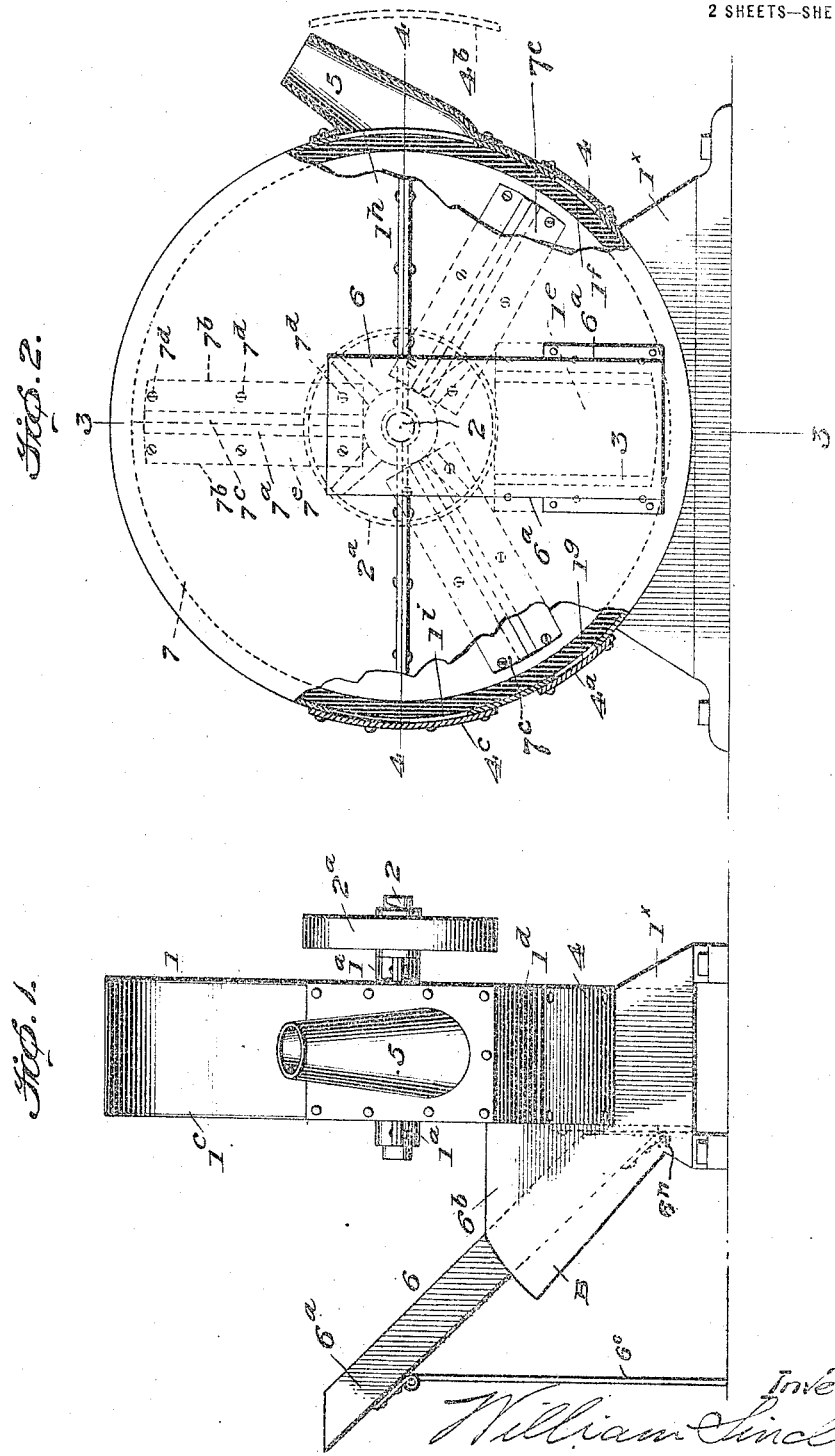
Inventor
William Sinclair
By Alexander & Dowell
Attorneys

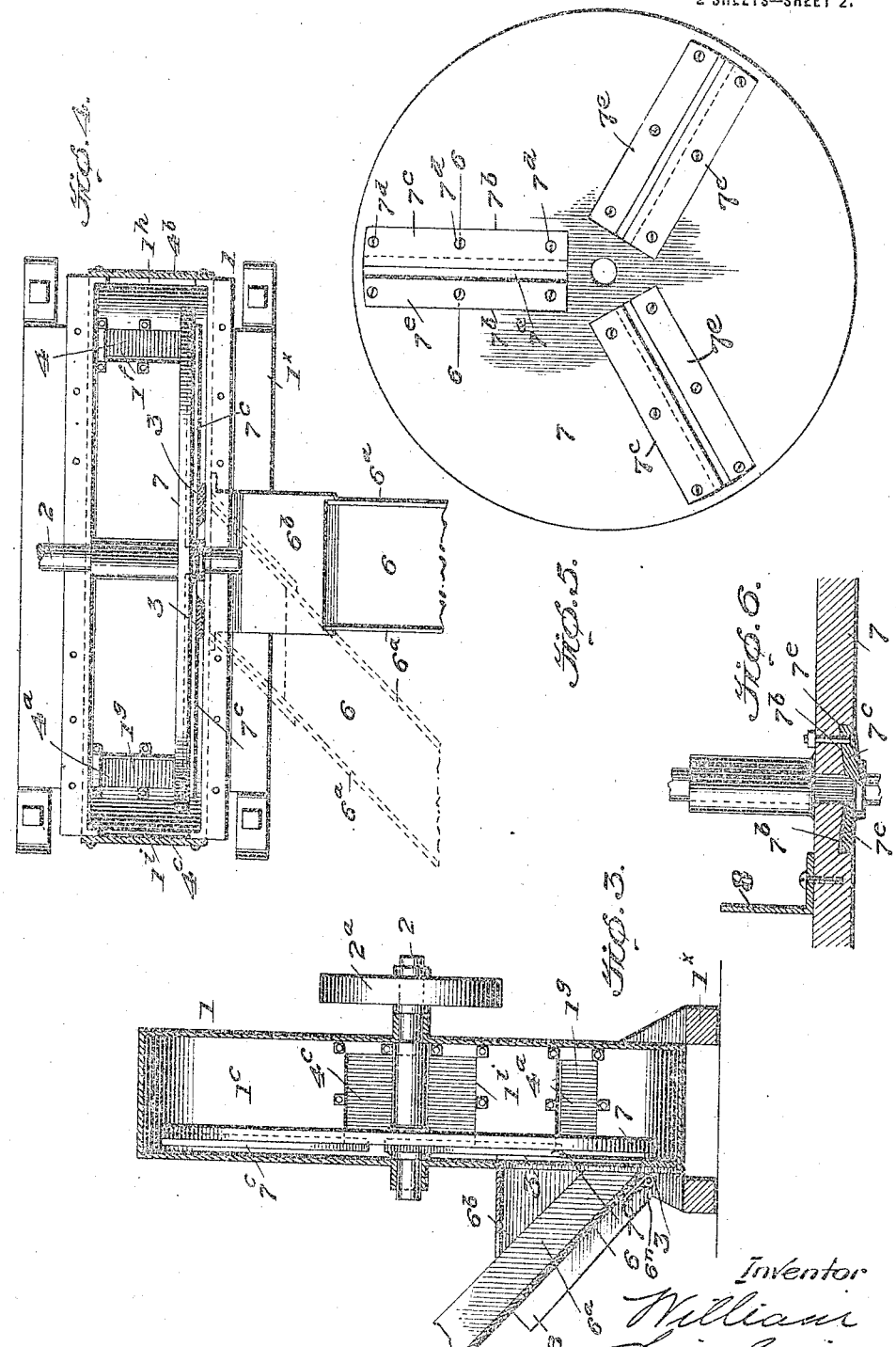

UNITED STATES PATENT OFFICE.

WILLIAM SINCLAIR, OF SAN ANTONIO, TEXAS.

ENSILAGE-CUTTING MACHINE.

1,247,460.

Specification of Letters Patent.  Patented Nov. 20, 1917.

Application filed July 26, 1917. Serial No. 182,933.

*To all whom it may concern:*

Be it known that I, WILLIAM SINCLAIR, a citizen of the United States, residing at San Antonio, in the county of Bexar and State of Texas, have invented certain new and useful Improvements in Ensilage-Cutting Machines; and I hereby declare that the following is a full, clear, and exact description thereof, reference being had to the accompanying drawings, which form part of this specification.

This invention is a novel improvement in machines for cutting ensilage and the like; and its objects are to provide a machine which will efficiently cut corn and other rough feed; that can be driven either clockwise or anti-clockwise; that can discharge the cut feed at different points, as may be most convenient; that will have very few parts; that has no cogs or gears to catch the operator's clothing; that will be practically fool-proof; that will not be dangerous to the operator or to a person standing beside the machine; that will do away with feed rolls or other mechanically operated feed devices; and that will enable corn, roots, melons and practically any kind of rough feed thrown into the feed chute to be cut or shredded and discharged at either the right hand or left hand side of the casing as desired.

A further object is to provide the cutting wheel with reversible cutter blades which can be adjusted to work when the wheel is to rotate either clockwise or anti-clockwise, as may be most desirable to conveniently arrange the cutter adjacent the silo or other receptacle into which the material is to be discharged.

The machine can be built very cheaply, as I eliminate expensive and cumbersome traveling feed tables, feed rolls, and gearing, without impairing the efficiency or capacity of the machine, and the capability of the machine for operation on various materials is enhanced.

In the accompanying drawings I have illustrated one practical machine embodying the invention, and will describe the same with reference thereto; and in the claims the features and combinations of parts for which protection is desired are summarized.

In said drawings:—

Figure 1 is a front elevation of the machine.

Fig. 2 is a side elevation thereof partly in section.

Fig. 3 is a section on the line 3—3 Fig. 2.

Fig. 4 is a horizontal section on the line 4—4 Fig. 2.

Fig. 5 is a detail face view of the cutter wheel.

Fig. 6 is a detail section through part of the cutter wheel.

As shown in the drawings the cutter comprises a preferably cylindric casing 1 which may be of any suitable construction, but is preferably made of sheet metal, and is provided with axially disposed bearings, of any suitable construction, for a shaft 2 on which the cutter wheel 7 is mounted within the casing. This shaft 2 extends out of the casing and is provided with a pulley $2^a$ or other suitable means whereby it can be driven from any suitable source of power, (not shown).

The casing may be divided into upper and lower halves, $1^c$ and $1^d$, which may be flanged at their sides and secured together by bolts as indicated in the drawings, so that the upper part of the casing may be removed when desired to repair or change the cutter wheel. The casing is mounted upon a base $1^x$ to which it is securely attached; and said base may be of any desired construction.

The casing is provided with a feed opening $1^e$ in one side, at which opening is attached a preferably U-shaped shear plate 3. The casing is also provided at opposite sides of opening $1^e$, and below the plane of the shaft, with openings $1^f$ and $1^g$ in its periphery, which openings are closed by removable plates 4 and $4^a$, when it is not desired to use the same. The casing is also provided in its periphery, above the openings $1^g$ and $1^f$, with openings $1^h$ and $1^i$, which may be closed by removable plates $4^b$ or $4^c$ when it is not desired to use the same. Either of these plates may be removed however, and in place thereof a discharge chute head 5 can be bolted to the casing over such opening so that material can be discharged through such head into a pipe or conveyer (not shown) and directed to the desired point of delivery.

Preferably detachably attached to the side of the casing adjacent the opening $1^e$ is a feed chute or trough 6, having side walls $6^a$. This chute is preferably set at an angle of about 45 degrees to the casing so as to direct material by gravity downward into the casing through the feed opening 1ᵉ. A hood 6ᵇ may be attached to the casing over the lower end of the chute and above the opening 1ᵉ to assist in directing material into said opening, and to serve as a guard to prevent the operator inadvertently putting his hand in the feed opening and being caught by the knives, and so that if the operator stumbled over the chute he would not come in contact with the knives.

If desired the chute might also be arranged at an angle to the opening 1ᵉ, when viewed from above, as indicated by the dotted lines in Fig. 4.

Upon the shaft 2 within the casing is mounted a cutter wheel; which preferably consists of a disk 7 provided with radially disposed slots 7ᵃ, and having at each side of each slot recesses 7ᵇ in which can be set knives 7ᶜ; which knives may be secured in the recesses by bolts 7ᵈ (see Fig. 5). In the construction shown the knives are changeable, that is they may be placed at either side of the slots 7ᵃ according to whether it is desired to run the machine clockwise or anticlockwise.

The recesses opposite the knives may be closed by removable filler-plates 7ᵉ, (see Figs. 5 and 6). Preferably the cutting edges of the knives project slightly from the face of wheel and they co-act with the cutter-bar 3, at the side of the feed opening, according to the direction of rotation of the cutting wheel.

The wheel may be provided with a fan blade or blades attached to the rear side thereof, as indicated at 8 in Fig. 5, so that when the wheel is rotated it will create a sufficient blast of air to discharge the cut material through the chute head 5, or any other casing opening that may be uncovered.

The extra openings in the casing enable the feed to be discharged on to the floor, or into the silo at either side of the machine, as is desired by the operator. By having the feed trough or chute arranged at an angle of practically 45 degrees to the cutting wheel I obtain a slicing cut on the material which would be advantageous in cutting heavy feed like corn stalks. In some cases the casing and wheel might be tilted so that the plane of the wheel would be at an angle to the horizontal and the feed chute be more nearly perpendicular, but I prefer to have the casing and wheel substantially vertical, and have the chute inclined at an angle of about 45 degrees to the horizontal as shown in the drawings.

The chute 6 may be hinged at its lower end to the casing as indicated at 6ⁿ, and its outer end may be provided with an adjustable leg 6°. The leg is preferably made telescopic and can be adjusted to support the chute at the desired angle to suit the operator and character of feed being handled. The chute should be so constructed and arranged that it cannot contact with the knives when raised to its highest position. This construction prevents load on the chute deflecting the shear plate. The sides of the hood 6ᵇ can be made wide enough to permit the adjustment of the chute.

By having the feed opening at the bottom and using an inclined chute I am able to feed the material by gravity when placed in the chute, and the operator can readily place the rough feed in the chute, as it is low down and readily accessible. By having the blades changeable and using a U-shaped shear plate or bar 3 at each side of the feed opening, (see Figs. 3 and 4) I am able to rotate the cutter wheel in either direction.

The chute is preferably detachably hinged so that it can be easily removed and placed out of the way when the machine is to be stored or transported, thus economizing space.

I claim:—

1. In a feed cutting machine, the combination of a cylindric casing having a feed opening in one side near its bottom and discharge openings in its periphery at opposite sides of the feed opening, a detachable closer for either of said discharge openings, a chute head detachably attached to the casing over one of said openings; a feed chute attached to said casing and communicating with the feed opening, cutter members attached to the casing at opposite sides of the feed opening; a shaft disposed axially of said casing, and a cutter wheel mounted on said shaft and having cutters adapted to be inserted on either of the opposite sides of openings therein.

2. In a feed cutting machine, the combination of a cylindric casing having a feed opening in one side near its bottom and a plurality of discharge openings in its periphery at opposite sides of the feed opening, detachable closers for said discharge openings; a chute head detachably attached to the casing over one of said openings; a feed chute attached to said casing and communicating with the feed opening, cutter members attached to the casing at opposite sides of the feed opening; a shaft disposed axially of said casing, and a cutter wheel mounted on said shaft and provided with slots, and cutter blades attachable to said wheel at either side of said slots.

3. A cutting machine comprising a cylindric casing having a feed opening in one side near its lower end and a plurality of discharge openings in its periphery at opposite sides of the feed opening, removable closers for the discharge openings, a feed chute attached to said casing adjacent the feed opening, and a cutter bar attached to the casing adjacent the opening; a shaft journaled axially of the casing, a cutter wheel mounted on said shaft within the casing and provided with radially disposed slots and duplicate recesses on opposite sides of the slots, cutter blades detachably attached to the wheel at the sides of the slot, and fillers attached to the wheel in the recesses opposite the blades.

4. The herein described cutting machine comprising a cylindric casing having a feed opening in one side near its bottom and a plurality of discharge openings in its periphery at opposite sides of the feed opening, removable closers for the discharge openings, a chute head adapted to be detachably attached to said casing over one of said openings; a feed chute attached to said casing adjacent the feed opening; and a cutter bar attached to the casing adjacent the feed opening; with a shaft journaled axially of the casing, a cutter wheel mounted on said shaft within the casing provided with radially disposed slots and duplicate recesses on opposite sides of the slots, cutter blades detachably attached to the wheel in the recesses at the sides of the slots, and fillers attached to the wheel in the recesses opposite the blades; the blades and fillers being interchangeable, substantially as described.

5. In a machine for cutting feed, the combination of a casing having a feed opening in its side, discharge openings in its periphery on opposite sides of said feed opening and detachable closures for said discharge openings, a feed chute communicating with the feed opening and extending at an angle thereto, a rotary wheel within the casing provided with cutter blades adapted to be reversely secured thereto, and cutter means at each side of the feed opening co-acting with the blades on the wheel.

6. In a machine for cutting feed, the combination of a casing having a feed opening in its side and discharge openings in its periphery, a feed chute communicating with the feed opening and extending at an angle thereto, a rotary cutter wheel within the casing provided with slots and adapted to be rotated either clockwise or anti clockwise, cutter blades attachable to the wheel at either side of the slots according to the rotation of the wheel clockwise or anti-clockwise, and cutter bars at each side of the feed opening co-acting with the blades on the wheel according to the direction of rotation thereof.

7. In a feed cutter, a cutting wheel having slots and duplicate recesses in one face at opposite sides of each slot, detachable cutter blades adapted to be fitted in the recesses at either side of each slot, and means for detachably fastening the cutter blades in either one of said duplicate recesses.

8. In a feed cutter, a cutting wheel having slots and duplicate recesses in one face at opposite sides of each slot, detachable cutter blades adapted to be secured in the recesses at either side of each slot, and means for detachably fastening the cutter blades in said recesses, with detachable filler plates adapted to be secured in the recesses at the sides of the slots and opposite the blades; and means for fastening the filler plates in such recesses.

In testimony that I claim the foregoing as my own, I affix my signature.

WILLIAM SINCLAIR.

Copies of this patent may be obtained for five cents each, by addressing the "Commissioner of Patents, Washington, D. C."